United States Patent [19]

Sumner

[11] Patent Number: 5,805,634
[45] Date of Patent: Sep. 8, 1998

[54] METHOD AND APPARATUS FOR TRANSMITTING AND RECEIVING INFORMATION AS A POWER HOPPED DIRECT SEQUENCE SPREAD SPECTRUM SIGNAL

[75] Inventor: Terence Edward Sumner, Azle, Tex.

[73] Assignee: Motorola, Inc., Schaumburg, Ill.

[21] Appl. No.: 756,630

[22] Filed: Nov. 26, 1996

[51] Int. Cl.⁶ .................................................. H04B 1/707
[52] U.S. Cl. .......................................................... 375/206
[58] Field of Search ................................. 375/200, 208, 375/202, 201, 206

[56] References Cited

U.S. PATENT DOCUMENTS 528,623  6/1894  Foster, Jr. ................................ 375/202
5,177,767  1/1993  Kato .......................................... 375/206
5,625,639  4/1997  Tomita et al. ............................ 375/200

*Primary Examiner*—Temesghen Ghebretinsae
*Attorney, Agent, or Firm*—R. Louis Breeden

[57] ABSTRACT

A method and apparatus transmits (400, 500) and receives (600) information as a power hopped direct sequence spread spectrum signal. The information is encoded (402) with a predetermined spreading sequence to produce a direct sequence spread spectrum, or DSSS, signal, and a plurality of simultaneous radio signals operating on a plurality of frequency slots ($F_1$–$F_{10}$) and modulated by the DSSS signal are generated (404, 406, 504). The output power of individual ones of the plurality of simultaneous radio signals is adjusted (408, 502) periodically according to a predetermined power hopping sequence. The information is received by demodulating (602) and processing (604–620) the signal from at least one of the plurality of frequency slots.

22 Claims, 7 Drawing Sheets

*700*

400

500

METHOD AND APPARATUS FOR TRANSMITTING AND RECEIVING INFORMATION AS A POWER HOPPED DIRECT SEQUENCE SPREAD SPECTRUM SIGNAL

FIELD OF THE INVENTION

This invention relates in general to radio communication systems, and more specifically to a method and apparatus for transmitting and receiving information as a power hopped direct sequence spread spectrum (PHDSSS) signal.

BACKGROUND OF THE INVENTION

In a direct sequence spread spectrum (DSSS) transmitter the usual spreading process is to multiply the data to be transmitted, i.e., the source information, by a spreading code. A chipping rate of the spreading code determines the amount of spreading. For a spread codeword of 512 bits, for example, a single bit in the source information will produce 512 bits in the output. Thus, a bandwidth of ±5 kHz for a 5 kb/sec. data stream will occupy ±2.5 MHz after spreading. The resulting spread signal is modulated at a carrier frequency.

The DSSS receiver is tuned to the center frequency of the spread carrier frequency, and the spread codeword is correlated to the received energy. Positive correlations and anti-correlations are interpreted as the source information data bits.

If an interferer occupies the same band as the desired signal, correlation with the desired signal will be hampered. If the desired DSSS signal is far away and a co-channel DSSS transmitter is nearer to the receiver with equal power, then the desired signal will ride on top of the interferer's. With limited dynamic range available in most receivers, at some point the near signal will swamp out the far signal by preventing the far signal from appearing inside the receiver. This near-far problem is well known. Frequency hopped spread spectrum (FHSS) transmission is a technique for solving the near-far problem.

The normal spreading process for FHSS is to re-transmit the original source message in a narrow-band mode on a particular sequence of center frequencies. The spreading rate determines the number of times the same signal is re-transmitted on other frequencies. A pseudonoise (PN) sequence determines the exact frequencies for each of the copies. For a spread sequence of 50, for example, a single series of bits from the source message will appear 50 times on 50 frequencies. Thus, a bandwidth of ±5 kHz for a 5 kb/sec. data stream will occupy ±250 kHz after spreading.

The FHSS receiver is tuned to a center frequency determined by the PN sequence, and the data is demodulated from the narrow-band channels. The version of the data with the lowest error rate is kept. The receiver tracks the frequency hops according the PN sequence, which is kept synchronized with that of the transmitter.

If a destructive interferer occupies the same band as the desired signal at a particular point in time, an earlier or a later copy on another channel will have to be used. If the desired FHSS signal is far away and a co-channel FHSS transmitter is nearer to the receiver with equal power, then the desired signal will separate from the interferer's at some point owing to the different PN sequences utilized by the interfering transmitter and the receiver. The probability that both sequences will land in the same frequency slot for all frequency hops is extremely low. The probability that various nearer interferers will land in the same slot for every copy is more difficult to analyze, especially for a heavily utilized band, but the number of hops generally increases with utilization. Other forms of interference on the channel have other solutions, but if wideband noise, such as DSSS, is present across the band, reception from far away may not be possible for FHSS.

Thus, what is needed is a transmission method and apparatus that can eliminate the near-far problem associated with DSSS transmission while retaining an ability to communicate in the presence of wideband noise, such as DSSS.

SUMMARY OF THE INVENTION

An aspect of the present invention is a method for transmitting information as a power hopped direct sequence spread spectrum (PHDSSS) signal. The method comprises the steps of encoding the information with a predetermined spreading sequence to produce a direct sequence spread spectrum (DSSS) signal, and generating a plurality of simultaneous radio signals operating on a plurality of frequency slots and modulated by the DSSS signal. The output power of individual ones of the plurality of simultaneous radio signals is adjusted periodically according to a predetermined power hopping sequence.

Another aspect of the present invention is a method in a receiver for receiving information transmitted from a base transmitter as a PHDSSS signal transmitted simultaneously in a plurality of frequency slots at a plurality of power levels, the plurality of power levels periodically adjusted in accordance with a predetermined power hopping sequence. The method comprises the steps of demodulating a signal from at least one of the plurality of frequency slots to produce at least one demodulated signal, and correlating a predetermined spreading sequence with the at least one demodulated signal. The method further comprises the steps of determining that the at least one demodulated signal is usable, in response to finding an expected number of substantial positive correlations and substantial anti-correlations in the correlating step; and decoding the at least one demodulated signal determined to be usable to derive the information.

A third aspect of the present invention is a transmitter for transmitting information as a PHDSSS signal. The transmitter comprises an encoder for encoding the information with a predetermined spreading sequence to produce a DSSS signal, and a radio signal generator coupled to the encoder for generating a plurality of simultaneous radio signals operating on a plurality of frequency slots and modulated by the DSSS signal. The radio signal generator is arranged to periodically adjust output power of individual ones of the plurality of simultaneous radio signals according to a predetermined power hopping sequence.

A fourth aspect of the present invention is a receiver for receiving information transmitted from a base transmitter as a PHDSSS signal transmitted simultaneously in a plurality of frequency slots at a plurality of power levels, the plurality of power levels periodically adjusted in accordance with a predetermined power hopping sequence. The receiver comprises an antenna for intercepting the PHDSSS signal, and a receiver circuit coupled to the antenna for demodulating a signal from at least one of the plurality of frequency slots to produce at least one demodulated signal. The receiver further comprises a correlator coupled to the receiver circuit for correlating a predetermined spreading sequence with the at least one demodulated signal, and a processing system coupled to the correlator for determining that the at least one demodulated signal is usable, in response to finding an expected number of substantial positive correlations and substantial anti-correlations by the correlator. The processing system is programmed to decode the at least one demodulated signal determined to be usable to derive the information.

DETAILED DESCRIPTION OF THE DRAWINGS

Figure 1:
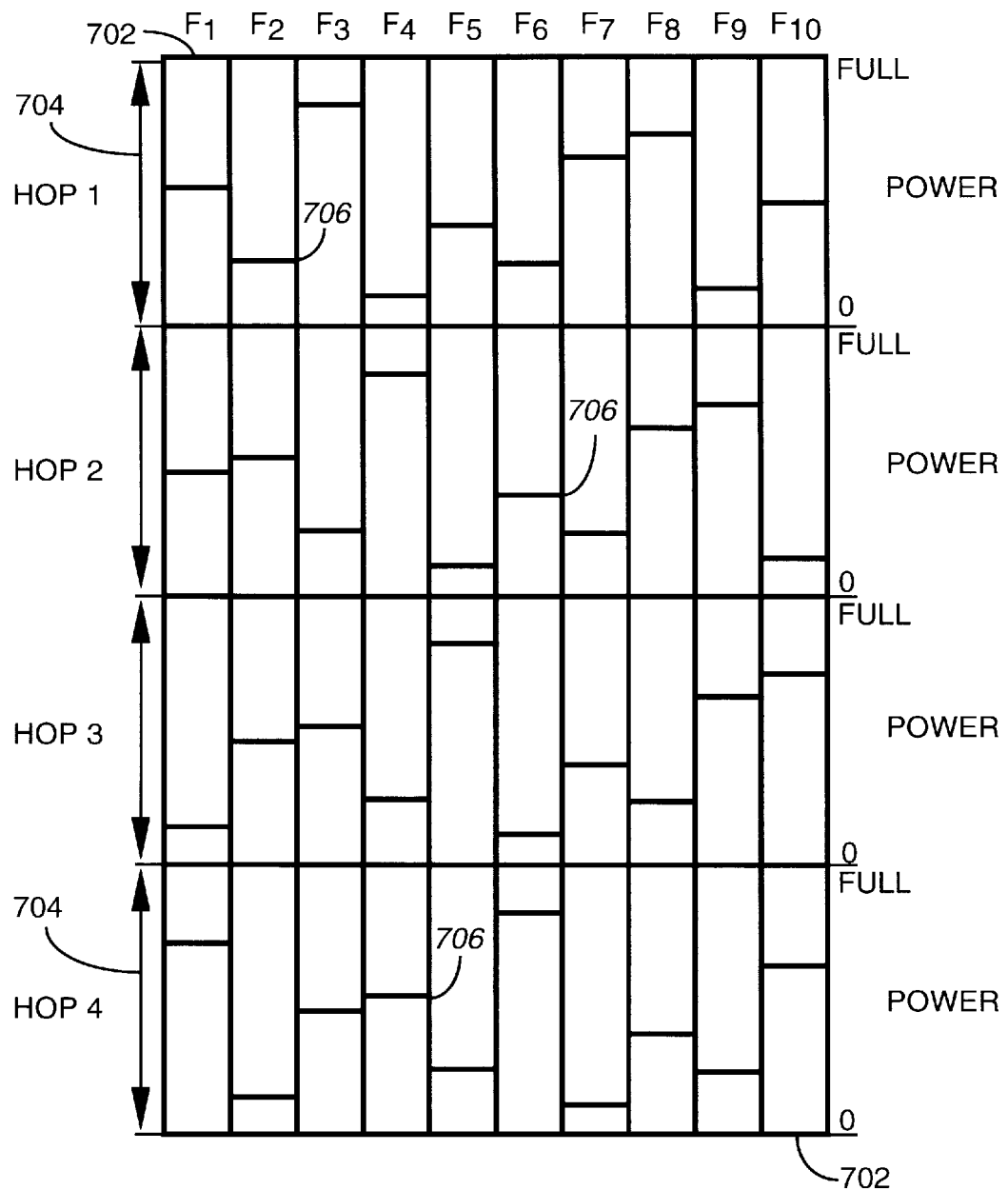
FIG. 1 is a power hopping diagram depicting a power hopping sequence in accordance with the present invention.

A novel power hopped direct sequence spread spectrum (PHDSSS) transmission method and apparatus is disclosed herein below. Briefly, the normal spreading process for DSSS is used to create a wide bandwidth baseband signal, i.e., a DSSS signal. Then, a predetermined power hopping sequence determines the power level to be used for each copy of the DSSS signal on several frequencies. In FHSS, copies are distributed in a time sequence on different frequencies at the same power level. In PHDSSS, copies are distributed in a space (frequency) sequence. FHSS depends on the time-sequenced frequencies to cause the power level in a frequency slot to exceed an interferer's power. PHDSSS deterministically sets the power level according to a sequence in each frequency slot, but transmits in all slots simultaneously. Each of the multiple copies on different frequencies in PHDSSS is multiplied by the power setting currently defined for that frequency. The copies at various power levels on various frequencies preferably are summed together for transmission. The power level can be set for each copy prior to modulation, as well as before modulation. Preferably, PHDSSS utilizes a well-known communication protocol such as a protocol from Motorola's FLEX™ family of protocols. The FLEX™ family of protocols provide error detection and correction to detect and correct transmission errors in codewords received. It will be appreciated that, alternatively, other similar protocols can be utilized as well.

The PHDSSS receiver is preferably tuned to at least one of the center frequencies of the copies. Simultaneously, the receiver can also be tuned to other center frequencies of the copies, based on the power control sequence and other factors, such as detected interference patterns. The spread codeword preferably is correlated to the received energy on each copy received. Positive correlations and anti-correlations are interpreted as the bits (or symbols) of the original information. When required for better reception, diversity reception can be achieved by combining (or selecting among) two or more signals recovered.

Knowing the predetermined power hopping sequence is not required if only a small number of slots are used and all are demodulated by the receiver. If a large number of frequency slots are used, then the receiver may need to demodulate only some of the slots, and knowledge of the sequence thus is of value. Picking only the highest power level is not necessarily the answer, since high desired signal power to interference is the goal. If only frequency hopped and power hopped signals are present in the band and all the sequences are known, then staying synchronized with the transmitter and choosing the slot of best ratio of desired signal to interference power is feasible and desirable. Note that not much power is required in a slot to give it some value. Spreading 10 copies each 30 dB below full power requires only −20 dB.

As with DSSS, if an interferer occupies the band to which the receiver is tuned, correlation with the desired signal will be hampered; however, the multiple copies permit recovery on different channels. If the desired PHDSSS signal is far away and a co-channel DSSS transmitter is nearer to the receiver with equal power, then the receiver can select a different channel. If the interferer is itself a PHDSSS type, then one of the frequency slots will have lower power than the desired signal. As with FHSS where the number of hops determines the probability of success given interference, the number of copies will play a role in the probability of success in PHDSSS. The difference is that interference may shift with the hops in FHSS but is stationary in PHDSSS for the duration of each power hop.

Referring to FIG. 1, a power hopping diagram 700 depicts a power hopping sequence in accordance with the present invention. The columns 702 of the diagram 700 represent ten frequency slots $F_1$–$F_{10}$, each carrying a PHDSSS signal. By way of example, four hops 704 are depicted in the diagram 700. Horizontal lines corresponding to each of the frequency slots $F_1$–$F_{10}$ indicate the power setting 706 used in each frequency slot for each of the four hops 704. Note that for successive hops the power hopping sequence used in this example shifts the power settings 706 for the frequency slots $F_1$–$F_9$ one slot to the right and then wraps the power setting used for slot $F_{10}$ back around to the $F_1$ slot. It will be appreciated that many other deterministic hopping sequences can be used in accordance with the present invention. Preferably, the power settings are such that the total power transmitted in all of the frequency slots $F_1$–$F_{10}$ does not exceed the maximum power output capacity of the transmitter used for transmitting the PHDSSS signal during any of the hops 704.

Figure 2:
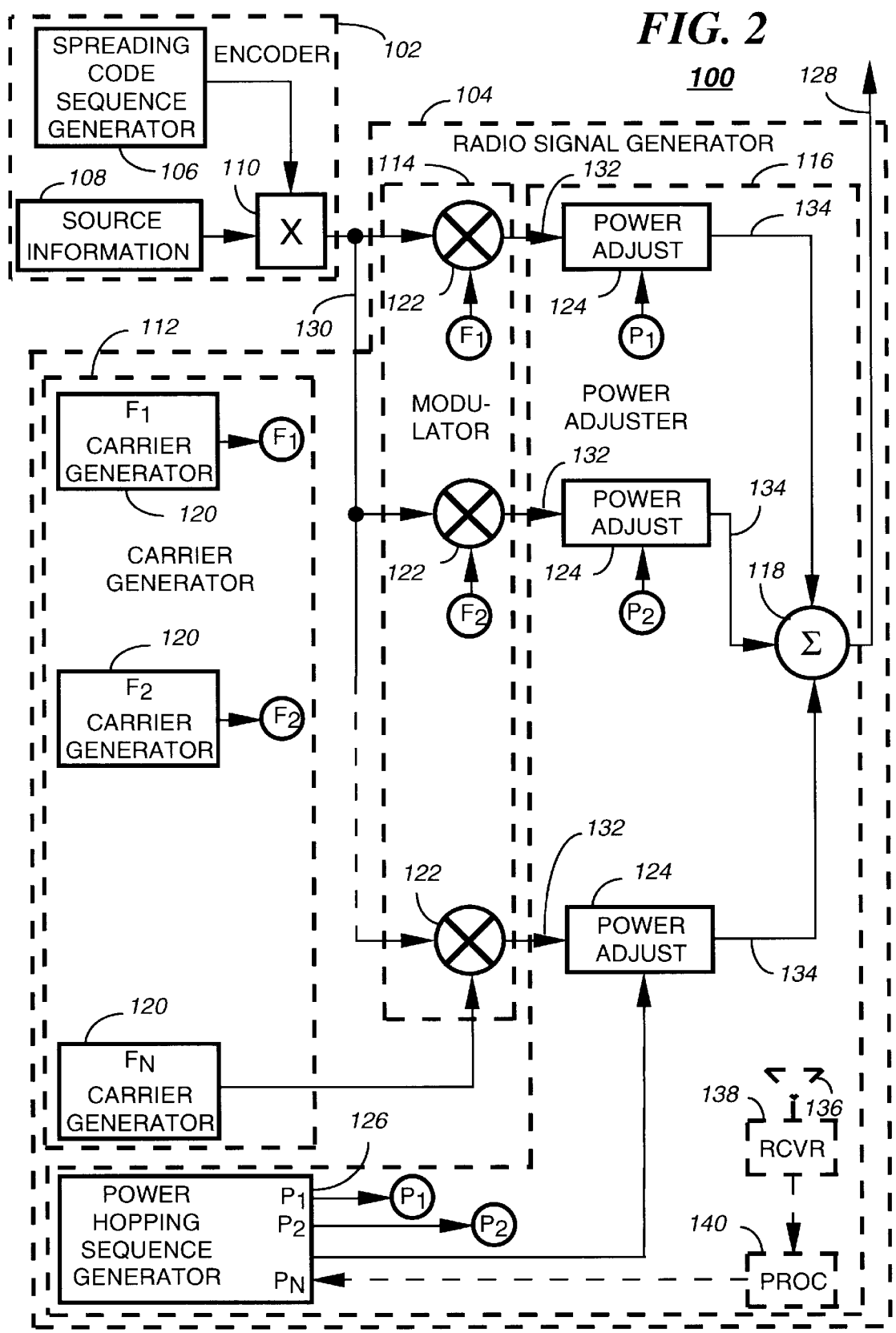
FIG. 2 is an electrical block diagram of a first transmitter in accordance with the present invention.

Referring to FIG. 2, an electrical block diagram of a first transmitter 100 in accordance with the present invention comprises an encoder 102 for encoding the information with a predetermined spreading sequence to produce a direct sequence spread spectrum (DSSS) signal at an encoder output 130. The encoder 102 comprises a conventional spreading code sequence generator 106 for generating the predetermined spreading sequence using techniques well known in the art. Source information, or data, 108 is multiplied by the predetermined spreading sequence in a conventional high speed multiplier 110 to produce the DSSS signal at the encoder output 130. The encoder output 130 is coupled to a radio signal generator 104 for generating at a radio signal generator output 128 a plurality of simultaneous radio signals operating on a plurality of frequency slots and modulated by the DSSS signal. The radio signal generator 104 is arranged to periodically adjust the output power of individual ones of the plurality of simultaneous radio signals according to a predetermined power hopping sequence, thereby producing a PHDSSS signal at the output 128.

The radio signal generator 104 comprises a carrier generator 112 for generating a plurality of carriers operating on a plurality of radio frequencies $F_1$–$F_N$. The carrier generator 112 preferably comprises a plurality of conventional single-frequency carrier generators 120 for generating the plurality of carriers simultaneously. The radio signal generator 104 further comprises a modulator 114 coupled to the carrier generator 112 and coupled to the encoder 102 for modulating the plurality of carriers with the DSSS signal to produce a plurality of modulated signals at a plurality of modulator outputs 132. The modulator 114 preferably comprises a plurality of conventional individual modulators 122, each coupled uniquely to one of the plurality of single-frequency carrier generators 120 for receiving one of the plurality of carriers, and each also coupled to the encoder output 130 for receiving the DSSS signal.

The radio signal generator 104 also includes a power adjuster 116 coupled to the modulator 114 for periodically adjusting the output power of the plurality of modulated signals according to a predetermined power hopping sequence to produce the PHDSSS signal at the radio signal generator output 128. The power adjuster 116 comprises a power hopping sequence generator 126 for generating the predetermined power hopping sequence output in parallel at a plurality of hop sequence outputs $P_1$–$P_N$. The power hopping sequence generator 126 preferably utilizes conventional techniques to generate a plurality of analog voltages on the hop sequence outputs $P_1$–$P_N$. The plurality of analog voltages are adjusted with each hop to new values between predetermined lower and upper limits according to the predetermined power hopping sequence. Preferably, the hops occur at a rate that is less than or equal to the source information data rate, e.g., one-tenth the data rate, and are synchronized to the data rate, so that interference with transmission of symbols is minimized. It will be appreciated that, alternatively, the power hopping sequence generator 126 can generate a plurality of digital values on the hop sequence outputs $P_1$–$P_N$ for controlling the power adjuster 116. It will be further appreciated that the hopping rate can be as fast as the source information data rate, or as slow as one hop per message sent.

The power adjuster 116 further comprises a plurality of power adjust elements 124. The power adjust elements 124 preferably are conventional high speed multipliers. Each of the plurality of power adjust elements 124 is uniquely coupled to one of the plurality of modulator outputs 132 and to one of the plurality of hop sequence outputs $P_1$–$P_N$. The plurality of power adjust elements 124 each multiply the one of the plurality of modulated signals at the coupled one of the plurality of modulator outputs 132 by the one of the plurality of analog voltages on the coupled one of the hop sequence outputs $P_1$–$P_N$, thereby producing a plurality of power hopped DSSS signals at a plurality of power adjuster outputs 134. The power adjuster 116 also includes a conventional summing element 118, for summing the plurality of power hopped DSSS signals at the plurality of power adjuster outputs 134 to produce the PHDSSS signal at the output 128 of the first transmitter 100.

Alternatively, in a two-way radio communication system, the power adjuster 116 can include an antenna 136 for intercepting a reverse channel signal comprising feedback from a receiver receiving the PHDSSS signal. The antenna 136 is coupled to a conventional reverse channel receiver 138 for demodulating the reverse channel signal to derive the feedback. The receiver 138 is coupled to a conventional microprocessor 140 for processing the feedback. The microprocessor 140 is coupled to the power hopping sequence generator 126 for adjusting parameters of the PHDSSS signal, e.g., the power hopping sequence, in accordance with the feedback. Such feedback and adjustment advantageously can improve the probability of getting an acceptable signal through on some frequency. It should be noted that the reverse channel receiver 138 is also referred to herein as a "base station receiver."

It will be further appreciated that, alternatively, a plurality of encoders 102 utilizing different spreading codes can be used to generate a plurality of DSSS signals. The plurality of DSSS signals can then be coupled to the plurality of individual modulators 122, such that the resulting PHDSSS signal uses a different spreading code on each of the frequency slots.

Figure 3:
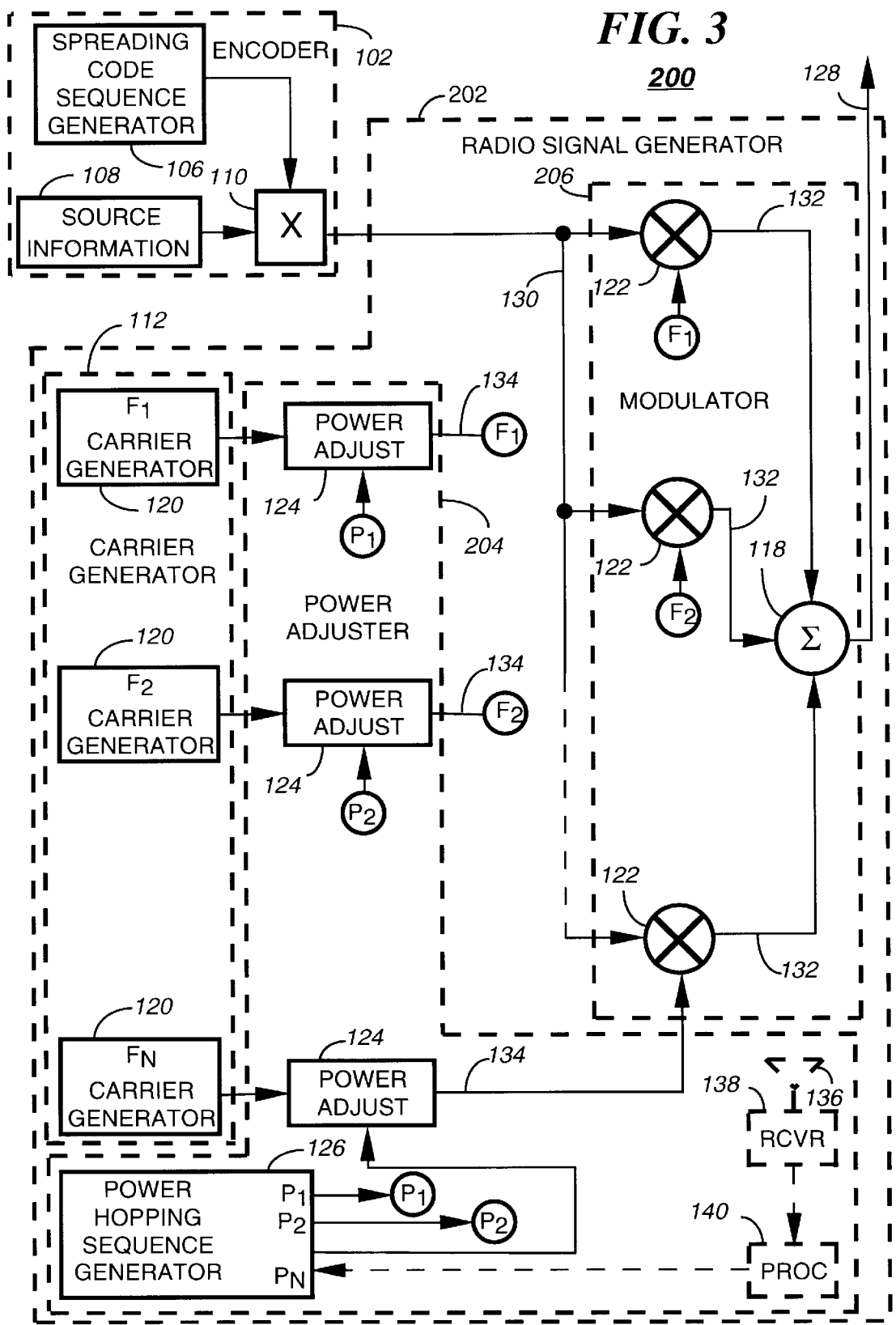
FIG. 3 is an electrical block diagram of a second transmitter in accordance with the present invention.

Referring to FIG. 3, an electrical block diagram of a second transmitter 200 in accordance with the present invention is depicted. The second transmitter 200 is similar to the first transmitter 100, the essential differences being that in the radio signal generator 202, the power adjuster 204 is coupled to the carrier generator 112 for periodically adjusting the output power of the plurality of carriers according to the predetermined power hopping sequence to produce a plurality of power-hopped carriers at the plurality of power adjuster outputs 134. Also, the modulator 206 is coupled to the power adjuster outputs 134 and coupled to the encoder 102 for modulating the plurality of power-hopped carriers with the DSSS signal to produce the PHDSSS signal. Because of the above differences, the summing element 118 was moved from the power adjuster 204 to the modulator 206. It should be noted that when either the first or second transmitter 100, 200 is used as a base station transmitter, it is also referred to herein as a "base transmitter."

Figure 4:
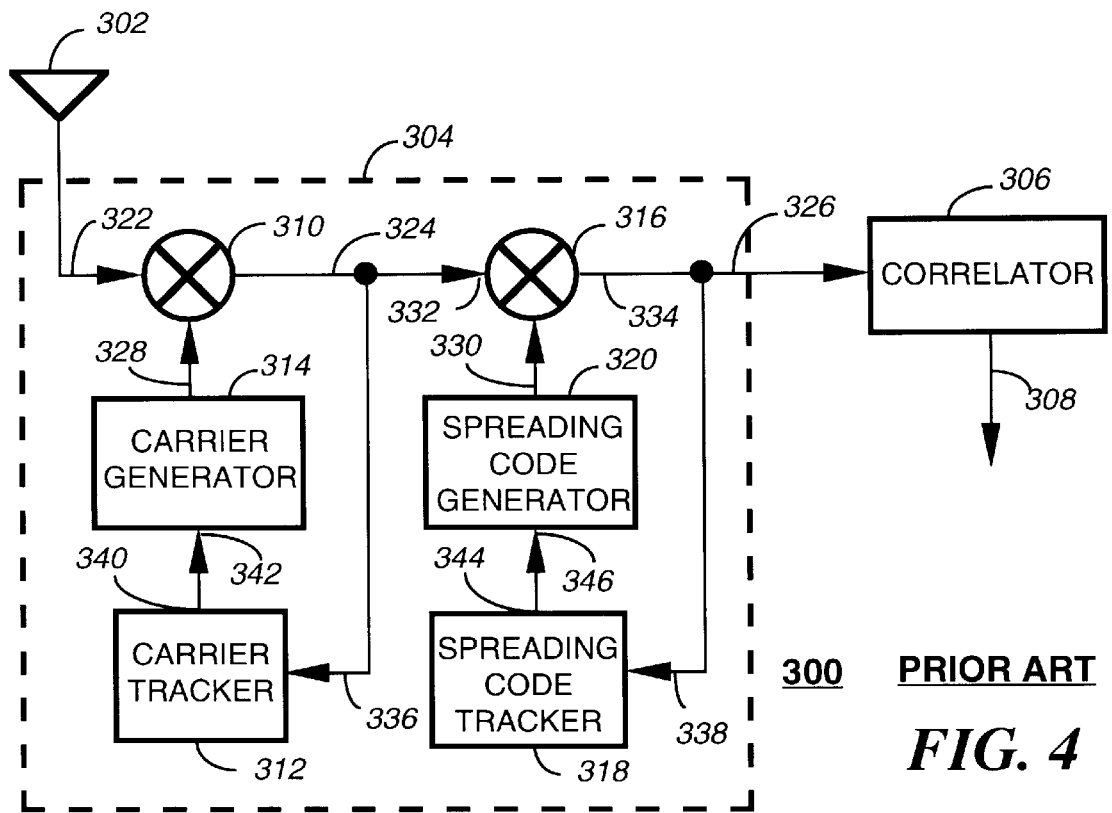
FIG. 4 is an electrical block diagram of a prior art generic DSSS receiver.

Referring to FIG. 4, an electrical block diagram depicts a prior art generic DSSS receiver 300 comprising an antenna 302 for intercepting a DSSS modulated signal. The DSSS modulated signal is coupled to a first input 322 of a conventional demodulator 310 of a receiver circuit 304. A second input 328 of the demodulator 310 is coupled to a conventional carrier generator 314 for generating a carrier signal. The demodulator 310 mixes the DSSS modulated signal and the carrier signal to produce a demodulated DSSS signal at the output 324 of the demodulator 310. The demodulated DSSS signal is coupled to the input 336 of a conventional carrier tracker 312 for producing a frequency control signal at the output 340 of the carrier tracker 312. A frequency trimming input 342 of the carrier generator 314 is coupled to the output 340 of the carrier tracker 312 for receiving the frequency control signal, thereby maintaining the carrier generator on frequency using well-known techniques. The demodulated DSSS signal at the output 324 is coupled to a first input 332 of a conventional multiplier 316. A second input 330 of the multiplier 316 is coupled to a conventional spreading code generator 320 for receiving a spreading code sequence therefrom. The multiplier 316 multiplies the demodulated DSSS signal and the spreading code sequence to produce despread source data at the output 334 of the multiplier, which is also the output 326 of the receiver circuit 304. The output 334 of the multiplier is coupled to the input 338 of a conventional spreading code tracker 318 for generating a phase control signal responsive to the despread source data at the output 344 of the spreading code tracker. The output 344 of the spreading code tracker 318 is coupled to a phase control input 346 of the spreading code generator 320 for supplying the phase control signal thereto to keep the spreading code sequence generated by the spreading code generator 320 synchronized with the demodulated DSSS signal. A conventional correlator 306 is coupled to the output 326 of the receiver circuit 304 for correlating the despread source data to produce a source data bit stream and a signal quality indication at an output bus 308. The signal quality indication is determined, for example, by comparing a measured maximum correlation value determined for the despread source data with a correlation value corresponding to 100% correlation. It will be appreciated that, alternatively, the correlator 306 can be integral to the spreading code tracker 318.

Figure 5:
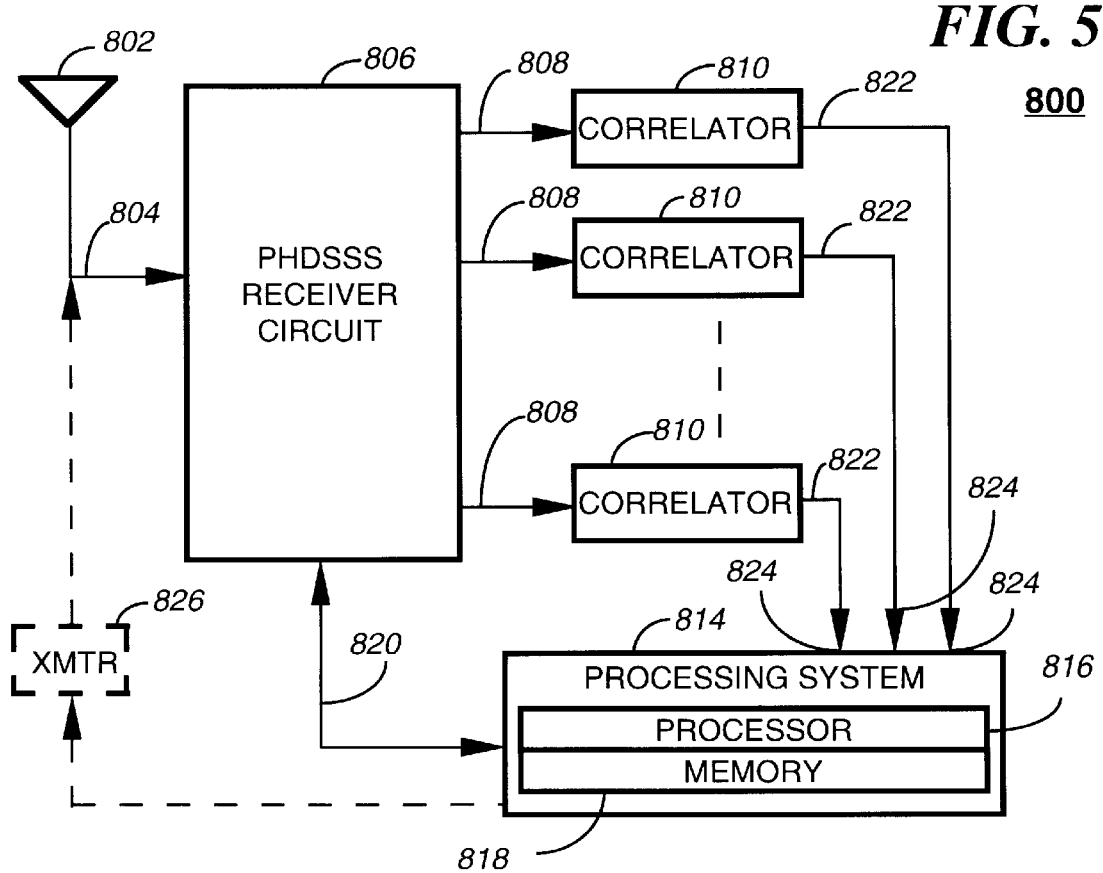
FIG. 5 is an electrical block diagram of a PHDSSS receiver in accordance with the present invention.

Referring to FIG. 5, an electrical block diagram depicts a PHDSSS receiver 800 in accordance with the present invention, comprising an antenna 802 for intercepting a PHDSSS signal. The antenna 802 is coupled to an input 804 of a PHDSSS receiver circuit 806 for demodulating a signal from at least one of a plurality of frequency slots utilized by the PHDSSS signal to produce at least one demodulated signal at a plurality of receiver circuit outputs 808. The receiver circuit 806 will be described further herein below. The plurality of receiver circuit outputs 808 are coupled to a plurality of conventional correlators 810 for correlating a predetermined spreading sequence with the at least one demodulated signal to provide at least one source data bit stream and corresponding signal quality indication at a plurality of output buses 822, utilizing well-known techniques for correlation and signal quality indication. The plurality of output buses 822 are coupled to a corresponding plurality of input buses 824 of a processing system 814 for determining that the at least one demodulated signal is usable, in response to finding an expected number of substantial positive correlations and substantial anti-correlations by the correlator. The processing system 814 is programmed to decode the at least one demodulated signal determined to be usable to derive information contained therein.

Here the word "substantial" means that a correlation value (as indicated by the signal quality indication) generated by the correlator 810 for time intervals corresponding to the symbol periods of the demodulated signal is outside of a predetermined range of correlation values. The predetermined range of correlation values is preferably determined by the highest and lowest correlation values having greater than a predetermined probability of being produced by pure noise (i.e., absence of signal). The "expected number" is equal to the number of symbols in the data being examined. Determining whether a signal is "usable" does not necessarily imply that all bits (or symbols) of the signal must be examined. For example, when receiving an error-correcting codeword, only a predetermined fraction of the bits of the codeword need be received with certainty to determine that the codeword is usable.

The processing system 814 is programmed to decode the at least one demodulated signal determined to be usable to derive source information in the PHDSSS signal. The processing system 814 comprises at least one conventional processor 816 and a conventional memory 818 for programming the processing system 814 in accordance with the present invention. The processing system 814 is preferably coupled to the PHDSSS receiver circuit through a data and control bus 820 for receiving therefrom additional signal quality information, e.g., received signal strength indication (RSSI) values corresponding to the at least one demodulated signal, which is utilized by the processing system 814 to help determine which signal(s) are the best candidates for decoding and, possibly, combining. Preferably the data and control bus 820 is also utilized by the processing system 814 for controlling the PHDSSS receiver circuit, e.g., for selecting which frequency slots to monitor and track.

Preferably, the processing system 814 is further programmed to determine that at least two demodulated signals are usable, in response to finding an expected number of substantial positive correlations and substantial anti-correlations in each of at least two demodulated signals. The processing system 814 is also programmed to combine the at least two demodulated signals determined to be usable to produce a diversity received demodulated signal by utilizing well-known techniques, and to decode the diversity received demodulated signal to derive the information. Here the word "combine" is defined broadly to include both selecting a single "best" signal to use for a time period, and forming a (weighted) sum of the at least two demodulated signals. In addition, the processing system 814 is programmed to control the PHDSSS receiver circuit 806 to demodulate the signal from all of the plurality of frequency slots, when the predetermined power hopping sequence is unknown to the processing system 814.

The processing system 814 is further programmed to cooperate with the receiver circuit 806 to synchronize with the predetermined power hopping sequence for demodulating the signal from the at least one of the plurality of frequency slots having a highest received signal quality during each hop, when the predetermined power hopping sequence is known to the processing system 814. It will be appreciated that, alternatively, the processing system 814 can be further programmed to cooperate with the receiver circuit 806 to synchronize with the predetermined power hopping sequence for demodulating the signal from the at least one of the plurality of frequency slots having an acceptable, received signal quality during each hop, when the predetermined power hopping sequence is known to the processing system 814. In addition, the processing system 814 is programmed to cooperate with the receiver circuit 806 to measure the received signal quality for the plurality of frequency slots, thereby producing a plurality of received quality measurements; and to select or combine at least two demodulated signals based on the plurality of received quality measurements. The decision to utilize diversity reception can be made, for example, when the highest correlation value in any of the frequency slots is below a predetermined value. Alternatively, the decision to utilize diversity reception can be made based on the number of errors detected in assembled codewords, segments of messages, or whole messages. It will be appreciated that, also alternatively, the receiver 800 can include a conventional reverse channel transmitter 826 coupled to the processing system 814 for transmitting feedback concerning received signal quality of the PHDSSS signal, using well-known techniques. The transmitter 826 is coupled to the antenna 802, or can utilize its own separate antenna, for transmitting the feedback.

Figure 6:
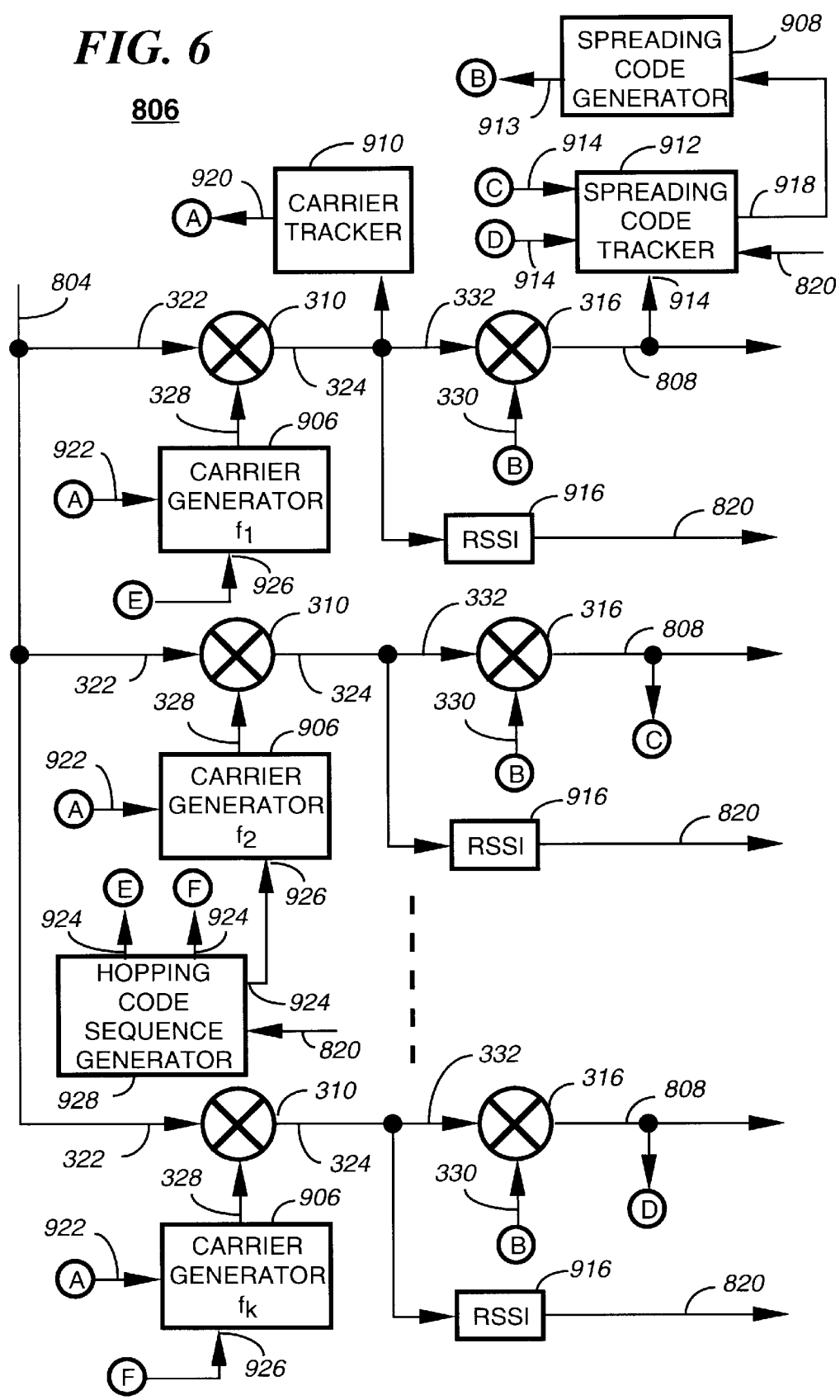
FIG. 6 is an electrical block diagram of a PHDSSS receiver circuit in accordance with the present invention.

Referring to FIG. 6, an electrical block diagram depicts the PHDSSS receiver circuit 806 in accordance with the present invention. The receiver circuit 806 comprises the input 804, which is coupled to a plurality of the first inputs 322 of a plurality of the demodulators 310. The second inputs 328 of the demodulators 310 are coupled to a plurality of carrier generators 906. The carrier generators are similar to the carrier generator 314, the essential difference being that the carrier generators 906 each comprise a frequency selection input 926 for determining one of a plurality of center frequencies to be generated by the carrier generator 906 utilizing well-known techniques. The frequency selection inputs 926 of the carrier generators 906 are coupled to a plurality of hopping frequency outputs 924 of a hopping code sequence generator 928 for determining the sequence of hopping frequencies to be generated by the carrier generators 906. Frequency trimming inputs 922 of the carrier generators 906 are coupled to a tracker output 920 of a conventional carrier tracker 910 for keeping the carrier generators on frequency. The carrier tracker 910 is coupled to the output 324 of one of the demodulators 310. Preferably, the hopping frequencies are related to one another by a predetermined frequency spacing and are synthesized from a single reference frequency; thus, only one carrier tracker 910 is required. It will be appreciated that, alternatively, a plurality of carrier trackers 910 can be utilized instead.

Preferably, the hopping code sequence generator 928 utilizes a conventional programmable counter, logic decoders, and latches coupled in a well-known manner to generate the appropriate frequency selection signals on the hopping frequency outputs 924, under control of the processing system 814 through the data and control bus 820. It will be appreciated that, alternatively, the processing system 814 can be coupled directly to the frequency selection inputs 926 of the carrier generators 906 to generate the frequency selection signals, thereby eliminating the hopping code sequence generator 928.

The demodulators 310 mix the PHDSSS signal and the carrier signal preferably to produce a plurality of demodulated DSSS signals at the outputs 324 of the demodulators 310. The outputs 324 are coupled to a plurality of the first inputs 332 of a plurality of the multipliers 316. A plurality of the second inputs 330 of the multipliers 316 are coupled to the output 913 of a spreading code generator 908. The multipliers 316 multiply the plurality of demodulated DSSS signals by a spreading code generated by the spreading code generator 908 to produce a plurality of despread source data signals at the plurality of receiver circuit outputs 808. Preferably the plurality of receiver circuit outputs 808 are coupled to a plurality of inputs 914 of the spreading code tracker 912. The spreading code tracker 912 is similar to the spreading code tracker 318, the essential difference being that the spreading code tracker 912 includes the plurality of inputs 914 and conventional logic selectors for enabling one of the plurality of inputs 914 under control of the processing system 814 through the data and control bus 820. Preferably, the processing system 814 enables the one of the inputs 914 based upon the signal quality information received from the receiver circuit 806 and the correlators 810, as described herein above. The enabled input 914 then generates a phase control signal responsive to the despread source data available at the enabled input 914. The phase control signal appears at the output 918 of the spreading code tracker 912 and is coupled to the spreading code generator 908 for supplying the phase control signal thereto to keep the spreading code sequence generated by the spreading code generator 908 synchronized with the plurality of demodulated DSSS signals.

It will be appreciated that, alternatively, the spreading code generator 908 can produce a plurality of different spreading codes at the output 913. The plurality of different spreading codes can then be uniquely coupled to the multipliers 316 for despreading a PHDSSS signal which has been encoded with a plurality of different spreading code sequences.

The plurality of outputs 324 of the demodulators 310 are also coupled to a plurality of conventional RSSI circuits 916 for determining signal strength of the demodulated DSSS signals on the outputs 324. The RSSI circuits 916 preferably measure the RSSI values of their respective signals, digitize the values, and make the values available to the processing system 814 via the data and control bus 820, utilizing well-known techniques. The processing system 814 then utilizes the RSSI values, along with the signal quality indications received from the correlators 810 to make decisions about the further processing of the received signals. Preferably, the receiver circuit 806 demodulates and despreads signals from all the frequency slots utilized by the PHDSSS transmitter. It will be appreciated that, alternatively, the receiver circuit 806 can be designed to demodulate and despread signals from a usable subset of the frequency slots utilized by the PHDSSS transmitter.

Figure 7:
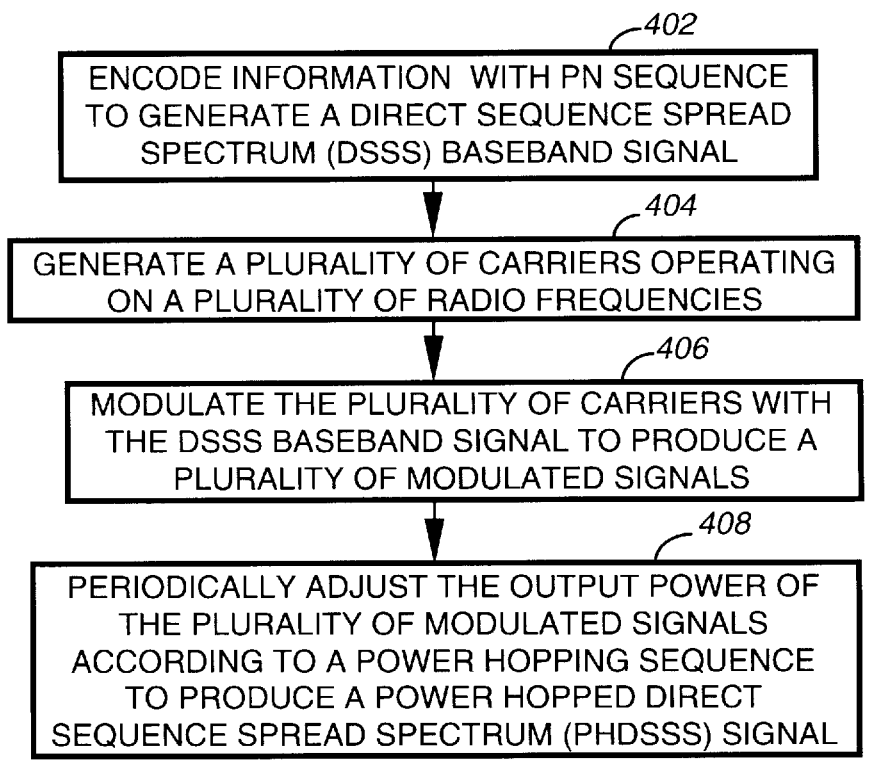
FIG. 7 is a flow chart depicting operation of the first transmitter in accordance with the present invention.

Referring to FIG. 7, a flow chart 400 depicting operation of the first transmitter 100 in accordance with the present invention begins with the encoder 102 encoding 402 the source information 108 with, preferably, a spreading sequence to generate a baseband DSSS signal. At the same time, the carrier generator 112 generates 404 a plurality of, e.g., 10, carriers operating on a plurality of radio frequencies. The modulator 114 modulates 406 the plurality of carriers with the DSSS baseband signal to produce a plurality of modulated signals. The power adjuster 116 then periodically, e.g., every 10 source data symbols, adjusts 408 the output power of the plurality of modulated signals according to the power hopping sequence generated by the power hopping sequence generator 126, thereby producing a power hopped direct sequence spread spectrum (PHDSSS) signal.

Figure 8:
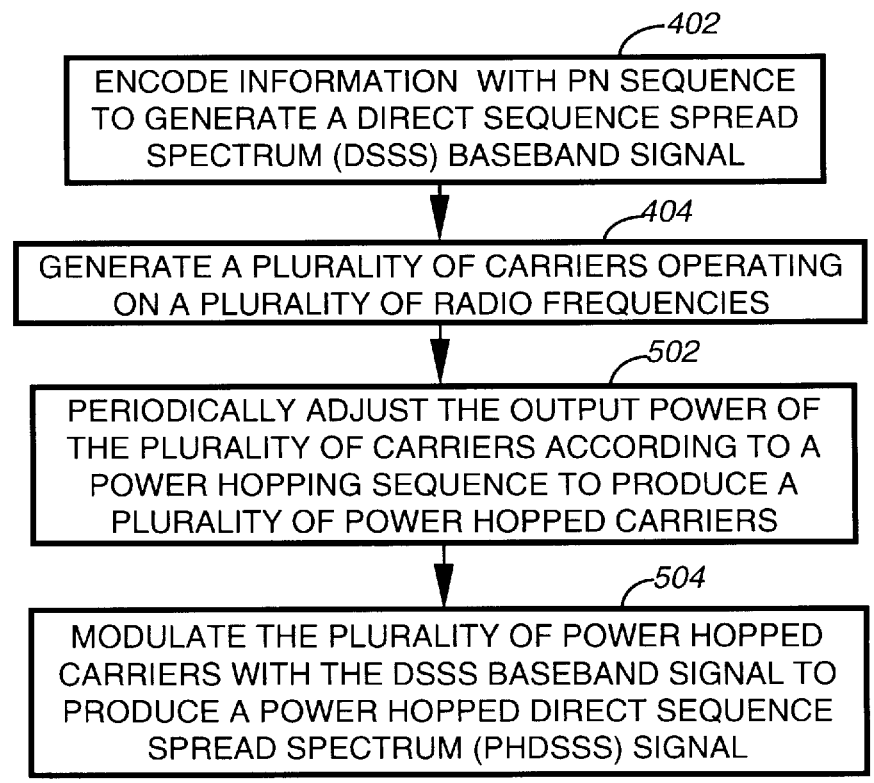
FIG. 8 is a flow chart depicting operation of the second transmitter in accordance with the present invention.

Referring to FIG. 8, a flow chart 500 depicting operation of the second transmitter 200 in accordance with the present invention begins with the encoder 102 encoding 402 the source information 108 with, preferably, a spreading sequence to generate a baseband DSSS signal. At the same time, the carrier generator 112 generates 404 a plurality of, e.g., 10, carriers operating on a plurality of radio frequencies. The power adjuster 204 then periodically, e.g., every 10 source data symbols, adjusts 502 the output power of the plurality of carriers according to the power hopping sequence generated by the power hopping sequence generator 126, thereby producing a plurality of power hopped carriers. The modulator 206 then modulates 504 the plurality of power hopped carriers with the DSSS baseband signal to produce a power hopped direct sequence spread spectrum (PHDSSS) signal.

Figure 9:
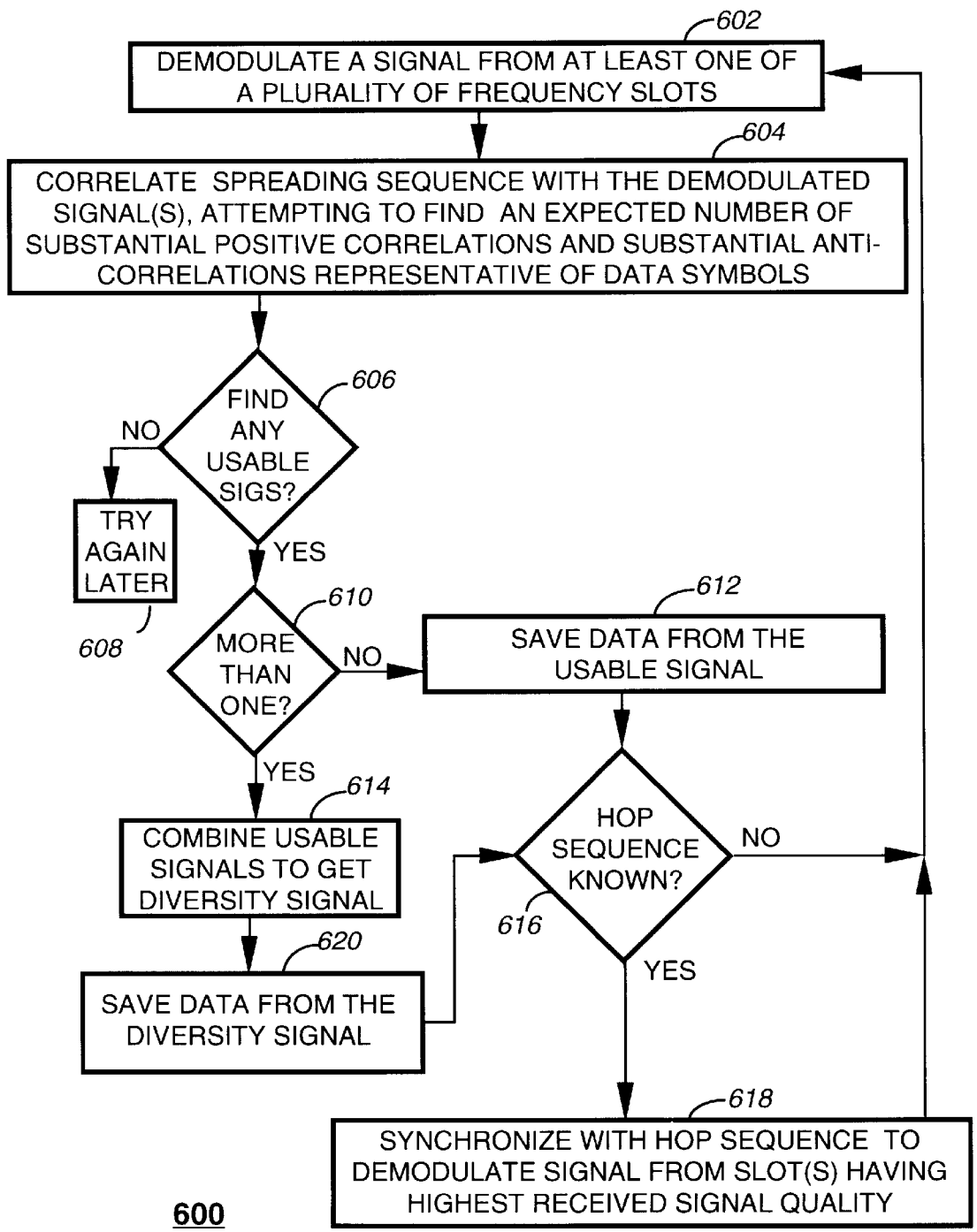
FIG. 9 is a flow chart depicting operation of the PHDSSS receiver in accordance with the present invention.

Referring to FIG. 9, a flow chart 600 depicting operation of the receiver 800 in accordance with the present invention begins with the processing system 814 controlling the receiver circuit 806 to demodulate 602 a signal from at least one of a plurality of frequency slots. The exact number of signals demodulated depends upon the capabilities of the receiver circuit 806 and upon any recent history of received signal quality of which the processing system 814 is aware. The processing system 814 and the correlators 810 then cooperate to correlate 604 a spreading sequence generated by the spreading code generator 908 with the demodulated signal(s) by attempting to find an expected number of substantial positive correlations and substantial anti-correlations representative of data symbols. It should be noted that the total number of correlations and anti-correlations expected by the processing system 814 is equal to the number of symbols transmitted in the demodulated signal being examined. For example, if the processing system 814 is examining the received data symbol-by-symbol, then the processing system 814 should expect to find one substantial correlation or substantial anti-correlation in the signal examined, if the symbol is received accurately. The processing system 814 then checks 606 whether any of the signals received are usable. In making this determination, the processing system 814 utilizes both the RSSI information received from the receiver circuit 806, and the signal quality information received from the correlators 810. If no signals are usable, the processing system 814 will try again 608 to locate a usable signal after a predetermined wait. If, on the other hand, the processing system 814 finds at least one usable signal, the processing system 814 then checks 610 whether there is more than one usable signal. If not, the processing system 814 stores 612 the data from the one usable signal in the memory 818, e.g., for presentation to the user. The processing system 814 then determines 616 whether the memory 818 has been preprogrammed with the power hopping sequence. If so, the processing system 814 synchronizes 618 with the power hopping sequence to demodulate the signal from the frequency slot which has the highest received quality during each hop. Preferably, this is accomplished by demodulating only the frequency slot having the power setting which produced the lowest error rate during the previous hop. This method of operation reduces the processing required, thereby advantageously reducing power consumption. If the signal quality is poor enough to require diversity reception, then signals from two or more slots having the highest received signal qualities can be similarly tracked. The processing system 814 then returns to step 602. If, on the other hand, in step 616 the processing system 814 determines that the memory 818 has not been programmed with the power hopping sequence, then the flow returns directly to step 602.

If, on the other hand, in step 610 the processing system 814 determines that there is more than one usable signal, then the processing system combines 614 the usable signals to produce a diversity signal through well-known techniques. For example, the diversity signal can be produced by selecting and combining the two usable signals having the best correlation values. It will be appreciated that, alternatively, the diversity signal can be produced by selecting and combining the two usable signals having the highest RSSI values, or a combination of the highest RSSI values and the best correlation values can be used to select two or more signals to be combined. Next, the processing system 814 saves 620 the data from the diversity signal in the memory 818. Flow then proceeds to step 616, as before.

Thus, it should be apparent by now that the present invention provides a transmission method and apparatus that advantageously eliminates the near-far problem associated with DSSS transmission while retaining an ability to communicate in the presence of wideband noise, such as DSSS.

While the foregoing has disclosed by way of example several embodiments in accordance with the present invention, it will be appreciated that many alternative embodiments in accordance with the present invention may occur to one of ordinary skill in the art, given the teachings of this disclosure. Consequently, the scope of the invention is delimited only in accordance with the following claims.

What is claimed is:

1. A method for transmitting information as a power hopped direct sequence spread spectrum (PHDSSS) signal, the method comprising the steps of:

encoding the information with a predetermined spreading sequence to produce a direct sequence spread spectrum (DSSS) signal; and generating a plurality of simultaneous radio signals operating on a plurality of frequency slots and modulated by the DSSS signal, wherein output power of individual ones of the plurality of simultaneous radio signals is adjusted periodically according to a predetermined power hopping sequence.

2. The method of claim 1, further comprising the step of receiving feedback from a reverse channel transmitter coupled to a receiver receiving the PHDSSS signal, and wherein the generating step comprises the step of altering the predetermined power hopping sequence in accordance with the feedback.

3. The method of claim 1, wherein the generating step comprises the steps of:

generating a plurality of carriers operating on a plurality of radio frequencies;

modulating the plurality of carriers with the DSSS signal to produce a plurality of modulated signals; and periodically adjusting the output power of the plurality of modulated signals according to the predetermined power hopping sequence to produce the PHDSSS signal.

4. The method of claim 1, wherein the generating step comprises the steps of:

generating a plurality of carriers operating on a plurality of radio frequencies;

periodically adjusting the output power of the plurality of carriers according to the predetermined power hopping sequence to produce a plurality of power-hopped carriers; and modulating the plurality of power-hopped carriers with the DSSS signal to produce the PHDSSS signal.

5. A method in a receiver for receiving information transmitted from a base transmitter as a power hopped direct sequence spread spectrum (PHDSSS) signal transmitted simultaneously in a plurality of frequency slots at a plurality of power levels, the plurality of power levels periodically adjusted in accordance with a predetermined power hopping sequence, the method comprising the steps of:

demodulating a signal from at least one of the plurality of frequency slots to produce at least one demodulated signal;

correlating a predetermined spreading sequence with the at least one demodulated signal;

determining that the at least one demodulated signal is usable, in response to finding an expected number of substantial positive correlations and substantial anti-correlations in the correlating step; and decoding the at least one demodulated signal determined to be usable to derive the information.

6. The method of claim 5, further comprising the steps of demodulating at least two signals from at least two of the plurality of frequency slots to produce at least two demodulated signals;

correlating at least one predetermined spreading sequence with the at least two demodulated signals;

determining that the at least two demodulated signals are usable, in response to finding an expected number of substantial positive correlations and substantial anti-correlations in each of the at least two demodulated signals;

combining the at least two demodulated signals determined to be usable to produce a diversity received demodulated signal; and decoding the diversity received demodulated signal to derive the information.

7. The method of claim 5, wherein the predetermined power hopping sequence is unknown to the receiver, and wherein the demodulating step comprises the step of demodulating the signal from all of the plurality of frequency slots.

8. The method of claim 5,
wherein the predetermined power hopping sequence is known to the receiver, and
wherein the demodulating step comprises the step of synchronizing with the predetermined power hopping sequence to demodulate the signal from the at least one of the plurality of frequency slots having a highest received signal quality during each hop.

9. The method of claim 5,
wherein the predetermined power hopping sequence is known to the receiver, and
wherein the demodulating step comprises the step of synchronizing with the predetermined power hopping sequence to demodulate the signal from the at least one of the plurality of frequency slots having an acceptable received signal quality.

10. The method of claim 5, further comprising the steps of:
measuring a received signal quality for the plurality of frequency slots, thereby producing a plurality of received quality measurements; and
selecting or combining at least two demodulated signals based on the plurality of received quality measurements.

11. The method of claim 5, further comprising the steps of
measuring a received signal quality for the plurality of frequency slots, thereby producing a plurality of received quality measurements; and
transmitting feedback about the received signal quality to the base transmitter for adjusting parameters of the PHDSSS signal.

12. A transmitter for transmitting information as a power hopped direct sequence spread spectrum (PHDSSS) signal, the transmitter comprising:
an encoder for encoding the information with a predetermined spreading sequence to produce a direct sequence spread spectrum (DSSS) signal; and
a radio signal generator coupled to the encoder for generating a plurality of simultaneous radio signals operating on a plurality of frequency slots and modulated by the DSSS signal, wherein the radio signal generator is arranged to periodically adjust output power of individual ones of the plurality of simultaneous radio signals according to a predetermined power hopping sequence.

13. The transmitter of claim 12, wherein the radio signal generator comprises:
a base station receiver for receiving feedback from a reverse channel transmitter coupled to a receiver receiving the PHDSSS signal, and
a processor coupled to the base station receiver and programmed to alter the predetermined power hopping sequence in accordance with the feedback.

14. The transmitter of claim 12, wherein the radio signal generator comprises:
a carrier generator for generating a plurality of carriers operating on a plurality of radio frequencies;
a modulator coupled to the carrier generator and coupled to the encoder for modulating the plurality of carriers with the DSSS signal to produce a plurality of modulated signals; and
a power adjuster coupled to the modulator for periodically adjusting the output power of the plurality of modulated signals according to the predetermined power hopping sequence to produce the PHDSSS signal.

15. The transmitter of claim 12, wherein the radio signal generator comprises:
a carrier generator for generating a plurality of carriers operating on a plurality of radio frequencies;
a power adjuster coupled to the carrier generator for periodically adjusting the output power of the plurality of carriers according to the predetermined power hopping sequence to produce a plurality of power-hopped carriers; and
a modulator coupled to the power adjuster and coupled to the encoder for modulating the plurality of power-hopped carriers with the DSSS signal to produce the PHDSSS signal.

16. A receiver for receiving information transmitted from a base transmitter as a power hopped direct sequence spread spectrum (PHDSSS) signal transmitted simultaneously in a plurality of frequency slots at a plurality of power levels, the plurality of power levels periodically adjusted in accordance with a predetermined power hopping sequence, the receiver comprising:
an antenna for intercepting the PHDSSS signal;
a receiver circuit coupled to the antenna for demodulating a signal from at least one of the plurality of frequency slots to produce at least one demodulated signal;
a correlator coupled to the receiver circuit for correlating a predetermined spreading sequence with the at least one demodulated signal; and
a processing system coupled to the correlator for determining that the at least one demodulated signal is usable, in response to finding an expected number of substantial positive correlations and substantial anti-correlations by the correlator, wherein the processing system is programmed to decode the at least one demodulated signal determined to be usable to derive the information.

17. The receiver of claim 16,
wherein the receiver circuit is arranged to demodulate at least two signals from at least two of the plurality of frequency slots to produce at least two demodulated signals, and
wherein the correlator is arranged to correlate at least one predetermined spreading sequence with the at least two demodulated signals, and
wherein the processing system is further programmed to:
determine that the at least two demodulated signals are usable, in response to finding an expected number of substantial positive correlations and substantial anti-correlations in each of the at least two demodulated signals;
combine the at least two demodulated signals determined to be usable to produce a diversity received demodulated signal; and
decode the diversity received demodulated signal to derive the information.

18. The receiver of claim 16, wherein the processing system is further programmed to control the receiver circuit to demodulate the signal from all of the plurality of frequency slots, when the predetermined power hopping sequence is unknown to the processing system.

19. The receiver of claim 16, wherein the processing system is programmed to cooperate with the correlator and the receiver circuit to synchronize with the predetermined power hopping sequence for demodulating the signal from the at least one of the plurality of frequency slots having a highest received signal quality during each hop, when the predetermined power hopping sequence is known to the processing system.

20. The receiver of claim 16, wherein the predetermined power hopping sequence is known to the receiver, and wherein the processing system is further programmed to synchronize with the predetermined power hopping sequence to demodulate the signal from the at least one of the plurality of frequency slots having an acceptable received signal quality.

21. The receiver of claim 16, wherein the processing system is programmed to cooperate with the correlator and the receiver circuit to:

measure a received signal quality for the plurality of frequency slots, thereby producing a plurality of received quality measurements; and select or combine at least two demodulated signals based on the plurality of received quality measurements.

22. The receiver of claim 16, further comprising a reverse channel transmitter coupled to the processing system, wherein the processing system is programmed to cooperate with the correlator, the reverse channel transmitter, and the receiver circuit to:

measure a received signal quality for the plurality of frequency slots, thereby producing a plurality of received quality measurements; and transmit feedback about the received signal quality to the base transmitter for adjusting parameters of the PHDSSS signal.

\* \* \* \* \*